(12) United States Patent
Dowlatkhah et al.

(10) Patent No.: US 11,483,301 B2
(45) Date of Patent: *Oct. 25, 2022

(54) METHOD AND SYSTEM TO MANAGE ACCESS TO A WIRELESS LOCAL AREA NETWORK

(71) Applicant: AT&T Intellectual Property I, L.P., Atlanta, GA (US)

(72) Inventors: Sangar Dowlatkhah, Johns Creek, GA (US); Zhi Cui, Sugar Hill, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,807

(22) Filed: May 21, 2021

(65) Prior Publication Data

US 2021/0281554 A1 Sep. 9, 2021

Related U.S. Application Data

(63) Continuation of application No. 15/225,280, filed on Aug. 1, 2016, now Pat. No. 11,044,240.

(51) Int. Cl.
*H04L 9/40* (2022.01)
*H04W 8/18* (2009.01)
(Continued)

(52) U.S. Cl.
CPC ............ *H04L 63/08* (2013.01); *H04L 63/102* (2013.01); *H04W 8/18* (2013.01); *H04W 12/069* (2021.01);
(Continued)

(58) Field of Classification Search
CPC . H04L 63/08; H04L 63/102; H04L 2101/622; H04W 12/088; H04W 12/084;
(Continued)

(56) References Cited

U.S. PATENT DOCUMENTS 5,737,523 A 4/1998 Callaghan et al.
7,233,664 B2 6/2007 Soliman et al.
(Continued)

FOREIGN PATENT DOCUMENTS

CN 104735666 3/2015
EP 1111861 A1 6/2001
WO 2013116756 A1 8/2013

OTHER PUBLICATIONS

Hosted Radius and Captive Portal, www.ironwifi.com, Apr. 27, 2014, pp. 1-7.

(Continued)

*Primary Examiner* — Linglan Edwards
*Assistant Examiner* — Forrest L Carey
(74) *Attorney, Agent, or Firm* — Guntin & Gust, PLC; John G. Rauch

(57) ABSTRACT

Aspects of the subject disclosure may include, for example, detecting a request for access to a wireless network via an access point. Responsive to a first determination that the identifier corresponds to an entry in the list, access is facilitated to the wireless network via the access point without the equipment of the requesting user providing credentials to the wireless network. The list includes a first set of entries corresponding to a first set of users having unrestricted access and a second set of entries corresponding to a second set of users having restricted access. Responsive to a second determination that the identifier does not correspond to any of the entries, a message is transmitted to equipment of the host regarding the request, and responsive to receiving approval, the list is updated to include the identifier. Other embodiments are disclosed.

20 Claims, 10 Drawing Sheets

(51) Int. Cl.
  *H04W 12/50* (2021.01)
  *H04W 12/084* (2021.01)
  *H04W 12/088* (2021.01)
  *H04W 84/12* (2009.01)
  *H04W 48/16* (2009.01)
  *H04L 101/622* (2022.01)
  *H04W 12/069* (2021.01)

(52) U.S. Cl.
  CPC ....... *H04W 12/084* (2021.01); *H04W 12/088* (2021.01); *H04W 12/50* (2021.01); *H04L 2101/622* (2022.05); *H04W 48/16* (2013.01); *H04W 84/12* (2013.01)

(58) Field of Classification Search
  CPC ..... H04W 12/50; H04W 12/069; H04W 8/18; H04W 48/16; H04W 84/12
  See application file for complete search history.

(56) References Cited

U.S. PATENT DOCUMENTS

| | | | |
|---|---|---|---|
| 7,515,569 | B2 | 4/2009 | Prasad et al. |
| 7,565,529 | B2 | 7/2009 | Beck et al. |
| 7,865,938 | B2 | 1/2011 | Shahbazi |
| 7,929,486 | B2 | 4/2011 | Karaoguz et al. |
| 8,254,886 | B2 | 8/2012 | Salkini et al. |
| 8,448,257 | B2 | 5/2013 | Garcia Garcia et al. |
| 8,510,803 | B2 | 8/2013 | Gronholm et al. |
| 8,713,641 | B1 | 4/2014 | Pagan et al. |
| 8,885,539 | B2 | 11/2014 | Laroche et al. |
| 8,997,246 | B2 | 3/2015 | Grinstein |
| 9,088,662 | B2 | 7/2015 | Yach |
| 9,106,666 | B2 | 8/2015 | Omar |
| 9,131,378 | B2 | 9/2015 | Jou |
| 9,420,425 | B1 | 8/2016 | McMullen et al. |
| 2005/0063333 | A1 | 3/2005 | Patron et al. |
| 2007/0011268 | A1 | 1/2007 | Banga |
| 2008/0089298 | A1 | 4/2008 | Anschutz et al. |
| 2009/0187983 | A1 | 7/2009 | Zerfos et al. |
| 2010/0008258 | A1 | 1/2010 | Ji et al. |
| 2010/0097986 | A1 | 4/2010 | Ylitalo et al. |
| 2010/0306827 | A1 | 12/2010 | Esteve Balducci et al. |
| 2011/0107436 | A1 | 5/2011 | Cholas et al. |
| 2012/0188991 | A1 | 7/2012 | Kholaif et al. |
| 2012/0252516 | A1 | 10/2012 | Miyabayashi et al. |
| 2013/0016648 | A1 | 1/2013 | Koskela et al. |
| 2013/0086648 | A1 | 4/2013 | Jaudon et al. |
| 2013/0111554 | A1 | 5/2013 | Sposato et al. |
| 2013/0210379 | A1 | 8/2013 | Cloutier et al. |
| 2014/0003263 | A1 | 1/2014 | Sheriff et al. |
| 2014/0003342 | A1 | 1/2014 | Sheriff et al. |
| 2014/0181902 | A1 | 6/2014 | Bone et al. |
| 2014/0206379 | A1 | 7/2014 | Mayor et al. |
| 2014/0215583 | A1 | 7/2014 | Ding et al. |
| 2015/0055551 | A1 | 2/2015 | Burckart et al. |
| 2015/0296377 | A1 | 10/2015 | Sheu |
| 2015/0326565 | A1 | 11/2015 | Kuang et al. |
| 2016/0021595 | A1 | 1/2016 | Czaja et al. |
| 2017/0026887 | A1 | 1/2017 | Sirotkin et al. |
| 2017/0086011 | A1 | 3/2017 | Neves et al. |
| 2017/0086103 | A1 | 3/2017 | Neves et al. |
| 2018/0035290 | A1 | 2/2018 | Dowlatkhah et al. |
| 2018/0035291 | A1 | 2/2018 | Dowlatkhah et al. |
| 2019/0007837 | A1 | 1/2019 | Dowlatkhah et al. |

OTHER PUBLICATIONS

Ruckus Wireless Awarded WiFi Security Patent for Dynamic Authentication and Encryption, www.ruckeswireless.com, Dec. 13, 2010, pp. 1-2.
Alvarez, Anthony E., Radius Server Access Control for WiFi Hot Spots, www.medium.com, May 4, 2016, pp. 1-7.
Phifer, Lisa, "Securing the wireless guest network: Authentication and management", searchnetworking.techtarget.com, Mar. 20, 2011, pp. 1-3.
Schnober, Carsten, Large Radius, www.adminmagazine.com, Aug. 9, 2014, pp. 1-7.

Solution: use visited network as free transport (such as Netflix) SP subs. Using Wi-Fi Puck can access any participating non-SP private and public venue Wi-Fi's seamlessly and partial pay to the host per access

400

500

METHOD AND SYSTEM TO MANAGE ACCESS TO A WIRELESS LOCAL AREA NETWORK

CROSS REFERENCE TO RELATED APPLICATIONS

This application is a continuation of U.S. patent application Ser. No. 15/225,280 filed on Aug. 1, 2016, pending. All sections of the aforementioned applications and patents are incorporated herein by reference in their entirety.

FIELD OF THE DISCLOSURE

The subject disclosure relates to a method and system to manage access to a wireless local area network.

BACKGROUND

WiFi is a technology that interconnects, in a wireless way, terminals such as a personal computer or a handheld device (for example, a PDA, a tablet or a mobile phone). Wireless local area networks have been standardized in an IEEE 802.11 suite generally referred to collectively as Wi-Fi®. (Wi-Fi is a registered trademark of the Wireless Ethernet Compatibility Alliance, Inc. of Austin, Tex.). Wi-Fi can be used to provide mobile users with wireless accesses to a broadband Internet, allowing users to access network resources and services in a home, an office or from some other public venue.

In a WiFi wireless network consisting of a wireless access point (WAP) and a wireless network card, the WAP is generally referred to as a network bridge or an access point and provides a bridge between a traditional wired Local Area Network (LAN) and a Wireless LAN (WLAN), thus any device equipped with a wireless network card can, via the WAP, share resources of the wired LAN or even a wide area network (WAN). The WAP can serve as a HUB or router with a built-in wireless transmitter, while the wireless network card serves as a client device responsible for exchanging wireless signals between the mobile device and the WAP.

Access to the WAP can be provided in an open manner allowing devices to connect in an unrestricted manner and often without requiring authorization. Alternatively or in addition, access to the WAP can be restricted to users providing an appropriate network access, e.g., encryption, key.

BRIEF DESCRIPTION OF THE DRAWINGS

Reference will now be made to the accompanying drawings, which are not necessarily drawn to scale, and wherein.

DETAILED DESCRIPTION

Figure 1:
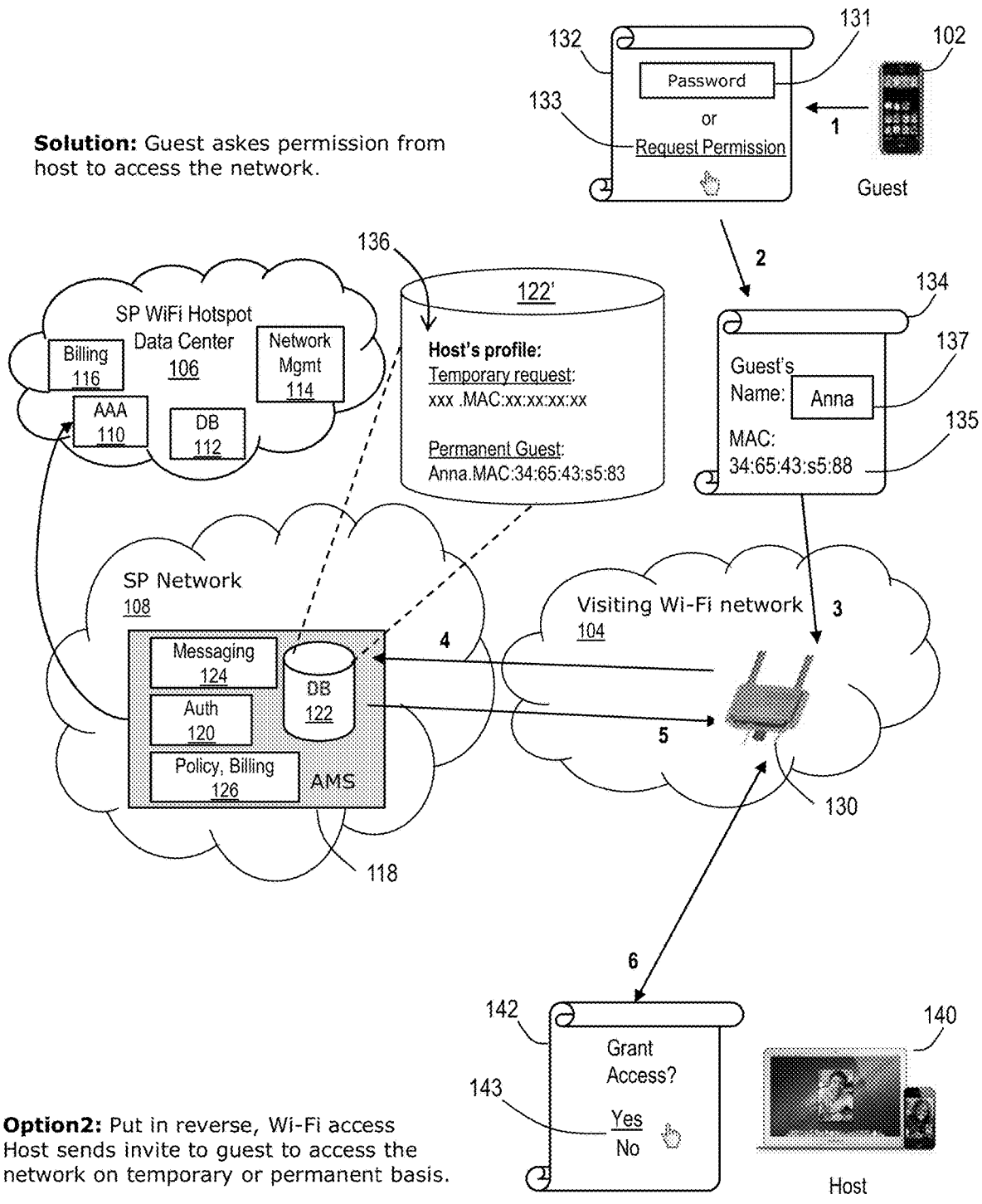
FIG. 1 depicts an illustrative embodiment of an architecture that allows a wireless access network to authenticate mobile communication devices.

The subject disclosure describes, among other things, techniques related to granting access to a Wi-Fi network, and more particularly to a system and method in which a Wi-Fi access owner can authenticate a trusted user according to a profile of the owner. According to the disclosure, any Wi-Fi access owner (e.g. a homeowner subscribing to a Wi-Fi service) can register with a management system to create preferences, which can include a list of users whom the access owner wishes to authenticate (e.g., friends or family visiting the homeowner). Other embodiments are described in the subject disclosure.

One or more aspects of the subject disclosure include a process that includes receiving a request from equipment of a requesting user for authentication to a wireless network for initiating a communication session via an access point of the wireless network, wherein the requesting user is not registered as a user of the access point, and wherein the request includes an identifier associated with the requesting user. The identifier is compared with entries in a list included in a profile of a network subscriber associated with the access point. Responsive to a first determination that the identifier corresponds to an entry in the list, based on the comparing, access is facilitated to the wireless network via the access point by the equipment of the requesting user. The equipment of the requesting user thereby obtains access to the wireless network based on the profile of the network subscriber without the equipment of the requesting user providing credentials to the wireless network to initiate the communication session. The list includes a first set of entries corresponding to a first set of requesting users with first equipment having unrestricted access to the wireless network at the access point, and a second set of entries corresponding to a second set of requesting users with second equipment having access to the wireless network restricted in accordance with access criteria established by the network subscriber and included in the profile. Responsive to a second determination that the identifier does not correspond to any of the first set of entries or the second set of entries, based on the comparing, a message is transmitted to equipment of the network subscriber regarding the request. Responsive to receiving approval of the request from the equipment of the network subscriber, the profile is updated to include the identifier.

One or more aspects of the subject disclosure include a system having a processing system that includes a processor and a memory that stores executable instructions that, when executed by the processing system, facilitate performance of operations. The operations include identifying a request from equipment of a requesting user for authentication to a wireless network for initiating a communication session via an access point of the wireless network, wherein the requesting user is not registered as a user of the access point, and wherein the request includes an identifier associated with the requesting user. The identifier is compared with entries in a list associated with a network subscriber associated with the access point. Responsive to a first determination that the identifier corresponds to an entry in the list, based on the comparing, access is facilitated to the wireless network via the access point by the equipment of the requesting user. The equipment of the requesting user thereby obtains access to the wireless network based on the list associated with the network subscriber without the equipment of the requesting user providing credentials to the wireless network to initiate the communication session. The list includes a first set of entries corresponding to a first set of requesting users with first equipment having unrestricted access to the wireless network at the access point and a second set of entries corresponding to a second set of requesting users with second equipment having access to the wireless network restricted in accordance with access criteria established by the network subscriber and included in the list. Responsive to a second determination that the identifier does not correspond to any of the first set of entries or the second set of entries, based on the comparing, a message is transmitted to equipment of the network subscriber regarding the request. Responsive to receiving approval of the request from the equipment of the network subscriber, the list is updated to include the identifier.

One or more aspects of the subject disclosure include a machine-readable storage medium comprising executable instructions that, when executed by a processing system including a processor, facilitate performance of operations. The operations include detecting a request from equipment of a requesting user for access to a wireless network for initiating a communication session via an access point of the wireless network, wherein the requesting user is not identified as a user of the access point, and wherein the request includes an identifier associated with the requesting user. The identifier is compared with entries in a list associated with a host associated with the access point. Responsive to a first determination that the identifier corresponds to an entry in the list, based on the comparing, access is facilitated to the wireless network via the access point by the equipment of the requesting user, the equipment of the requesting user thereby obtaining access to the wireless network based on the list without the equipment of the requesting user providing credentials to the wireless network to initiate the communication session. The list includes a first set of entries corresponding to a first set of requesting users with first equipment having unrestricted access to the wireless network at the access point and a second set of entries corresponding to a second set of requesting users with second equipment having access to the wireless network restricted in accordance with access criteria established by the host and included in the list. Responsive to a second determination that the identifier does not correspond to any of the first set of entries or the second set of entries, based on the comparing, a message is transmitted to equipment of the host regarding the request. Responsive to receiving approval of the request from the equipment of the host, the list is updated to include the identifier.

This application is related to the following commonly owned U.S. patent application filed on even date herewith and incorporated herein by reference in its entirety: entitled "Method and System to Dynamically Authenticate and Grant Access to Non-Trusted Anonymous Wi-Fi."

In today's fast expanding online presence with social network and ever growing online services, having access to internet where ever you go is paramount. Service providers use considerable amount of resources to offer certain quality of service to their customers. Sometimes, these services such as video streaming services need certain bandwidth to ensure the experience their subscriber are accustomed to. In most cases the mobile network is either not fast enough or it is too expansive to use for such services as Netflix for extended time. So the subscribers forced to use Wi-Fi access where possible.

In other hand also, the Wi-Fi access owner whether it is a private or public entity, either reluctant to grant access to users because of security reasons or simply in case of public venues they don't have ability to offer access to customers walking to their establishment in a controlled manner.

In a case of private use, when a visitor comes to a private home and needs to access their Wi-Fi connection, the owner either has to be able to create an open guest SSID to grant access to the visitor in a controlled manner or physically hand out the WAP password to the visitor. Neither of these options are optimal solution. In the first scenario you have an open guest network and the second option you have to change your password since it is known by another user.

In case of a public venue it gets even more complicated and security nightmare, especially for small public venues who doesn't have the knowhow and/or budget to invest on proper security architecture in a safe manner.

This disclosure helps with both issues, as well as open an option to any Wi-Fi host (private or public) to sign on with service provider and securely grant access to subscriber of services for a compensation.

FIG. 1 depicts an illustrative embodiment of an architecture 100 that allows a wireless access network to authenticate mobile communication devices. In the illustrative example a host provides a WLAN, referred to as a visiting Wi-Fi network 104. WLANs are generally understood to include wireless computer networks that links two or more devices using a wireless distribution method (often spread-spectrum or OFDM radio) within a limited area such as a home, school, computer laboratory, or office building.

The visiting Wi-Fi network 104 is generally known to and operated by host equipment 140, such as a host's PC, e.g., through a wireless modem, a host's PDA or tablet device and/or a host's mobile phone. The visiting Wi-Fi network 104 includes a wireless access point 130 that generally allows Wi-Fi compliant wireless devices 102 to connect to a wired network 108. A WAP 130 generally connects directly to a wired Ethernet connection, providing wireless connections using radio frequency links for other devices to utilize that wired connection. Most WAPs support the connection of multiple wireless devices to one wired connection. The WAP 130 can be connected to a router, and in at least some embodiments, be incorporated together as a single unit.

Typically, access to a wide area network is accomplished by a broadband modem that takes broadband data signals from a cable service, fiber service, and/or digital subscriber link service and translates it to the Ethernet LAN format. An Internet Service Provider typically provides subscribers with a broadband modem having a single Internet Protocol (IP)

address. A router allows the single IP address to be shared with multiple devices at any given location, such as a home, business or retail outlet. In some embodiments, a single device includes functionality of the broadband modem, the router and the WAP 130.

Access to the broadband service can be controlled by physical connections to the cable modem and/or router. Namely, access to a location of the cable modem/router can be controlled by a host, allowing selective access by providing physical access to ports of the router. Access to the WLAN presents a more challenging problem. Namely, the wireless coverage of the WAP 130 extends within a certain geographical region, or coverage area. A mobile user within the coverage area would be able to discover the Service Set IDentifier (SSID) is a unique ID that consists of 32 characters and is used for naming wireless networks. A host may configure the WAP 130 with an open guest SSID, allowing virtually any mobile devices within the coverage area to access the broadband connection over the WLAN.

Such open, unrestricted access is generally undesirable for various reasons, such as security and/or privacy. A host may alternatively configure the WAP 130 with an access key, password or passphrase. Accordingly, only users that provide the correct access key will be granted access to the WLAN. This access key can be provided by and/or stored in association with mobile devices of the host, allowing the host equipment 140 to access the WLAN. Should a host choose to share WLAN access with others, the host has two alternatives: provide an open guest SSID, or provide a guest with the access key. It is cumbersome for the host to provide the access key to guests, as the key can be lengthy and difficult to remember. Another consideration is that once the host has provided the guest with the access key, the host is unable to restrict future access to the same guest, or control further unauthorized distribution of the access key by the guest.

The illustrative system 100 provides an access management service 118 that can be adapted or otherwise configured, e.g., by equipment of the host 140, to provide a greater degree of access control to the visiting Wi-Fi network 104 than would otherwise be available. The access management system 118 includes an authorization module 120, a storage module 122, a messaging module 124, and a policy and/or billing module 126. In at least some embodiments, the access management system 118 is accessible to the host equipment 140 and/or the WAP 130 over the broadband connection. In the illustrative example, the access management system 118 is operated by a service provider, such as an Internet service provider of the host. It is understood that in at least some embodiments, the access management system 118 can be operated by another entity, such as another Internet service provider and/or a third-party access management service provider.

The storage module 122 can include records, files and/or listings of features that are configurable by the equipment of the host 140. In at least some embodiments, the listings are in the form of a host profile 136. Without restriction, the host profile 136 can include one or more of a first list of authorized users, e.g., a "white" list, and a second list of unauthorized or blocked users, e.g., a "black" list. In at least some embodiments, the list of authorized users can further distinguish between users with unrestricted access, e.g., the "white" list and other users with some form of restricted access, e.g., a "gray" list.

In some embodiments, restrictions are predetermined, e.g., according to a service subscription level of the host and/or the guest. Alternatively or in addition, restrictions can be set or otherwise selected by the host. It is understood that such restrictions can be included within the host profile 136. Such configurable restrictions can be applied universally to all guests, or selectively to groups of guests and/or differentiated according to particular individual guests.

In operation, a guest is visiting a host's residence and needs to access the Internet, e.g., to access the guest's separately subscribed services. For example, the guest may wish to access a latest NFL Sunday game video recorded on the guest's personal Digital Video Recorder (DVR), and accessible through the guest's subscribed services. The guest uses a mobile device, such as a mobile phone 102, to establish Wi-Fi connection to the host's visiting Wi-Fi network 104. The guest, through Wi-Fi settings of the mobile phone 102 sees the Wi-Fi SSID of the visiting Wi-Fi network 104.

The guest requests permission to access the visiting Wi-Fi network 104, e.g., by selecting the appropriate SSID. A pop-up window or similar access-request display element 132 is presented on a display of the mobile phone 102. In some embodiments, the access-request display element includes a user entry field 131 for a predetermined network key, password, pass phrase. Should the guest have access to the network key, the key can be entered it in this field 131 to request access to the Wi-Fi network. If the key is correct, e.g., as determined by the WAP 130 and/or the authorization management service 118, Wi-Fi access can be granted and the user can access broadband services.

It is worth noting, that if the key is associated with the WAP only 130, the guest may have to perform a separate access request to access subscribed services, such as access to the guest's DVR service. However, if the access key is associated with the host's profile 136, the authorization management system 118 can be adapted or otherwise configured to facilitate authorization of the guest to the guest's subscribed services. This can be accomplished, e.g., by an ID of the guest's mobile phone 102. The authorization management system 118 can consult subscriber records, e.g., at the service provider network 108 and/or at a service provider data center 106.

In some embodiments, the service provider network 108 and/or the service provider data center 106 accessed through the visiting Wi-Fi network 104 can be the same service provider as for the guest's subscribed services. In this instance, the service provider can have access to subscriber databases, e.g., including the guest's identity, the guest's equipment including the mobile phone 102, and any services subscribed to by the guest, such as the example DVR service. The guest can be authorized automatically based on successfully having established access and/or authorization to access the visiting Wi-Fi network 104. Alternatively or in addition, the guest can be directed to a web site to coordinate a separate authentication, e.g., directly with the guest's service provider.

Alternatively or in addition, the service provider network 108 and/or the service provider data center 106 can be a different service provider than that providing the guest's subscribed services. In this instance, the host's service provider can facilitate identification of the guest's service provider, e.g., by searching online records of the host's service provider, the guest's service provider and/or records managed by a third party. Once the have access to subscriber databases, e.g., including the guest's identity, the guest's equipment including the mobile phone 102, and any services subscribed to by the guest, such as the example DVR service. Once again, the guest can be authorized automatically based on successfully having established access and/or authorization to access the visiting Wi-Fi network 104. Alternatively or in addition, the guest can be directed to a web site to coordinate a separate authentication, e.g., directly with the guest's service provider.

In some embodiments, the access-request display element 132 allows the guest to enter a request for permission to access the visiting Wi-Fi network 104. For example, the display element 132 can include a "request permission" selectable button or field 133. Should the guest not have access to a valid password or choose to make a special request or otherwise modify access to the visiting Wi-Fi network 103, a selection of the request permission field can be made using the guest's mobile phone 102.

In response to a selection of the request permission field 133, a request message is forwarded to the guest's mobile phone 102 and presented at a display, e.g., a pop-up window or similar permission request display element 134 of the guest's mobile phone 102. In some embodiments, the request access display element 134 includes a Media Access Control (MAC) address 135 of the guest's mobile phone 102, along with a user entry field 137. For example, the user entry field 137 can be intended for entry of the guest's name. Alternatively or in addition the user entry field 137 can be used by the guest to enter a message to the host.

The information, e.g., the MAC address, name and/or message obtained by way of the permission request display element 134, is sent over a wireless link to the WAP 130. The WAP 130, in turn, forwards the information to a predefined address, e.g., the access management system 118, sometimes referred to as an Identity Management System (IMS). The IMS 118 looks up or otherwise identifies and accesses the user profile 136 of the host. In some embodiments, the IMS 118 then determines, from the host's profile 136, whether the guest has previously registered, e.g., in a white list, signifying that access should be granted, or black list, signifying that access should be blocked. Based on a previous registration, the IMS 118 facilitates access and/or restriction of the guest to the visiting Wi-Fi network 104.

In response to the IMS 118 determining that the guest has not been previously registered in association with the host's visiting Wi-Fi network 104, the IMS forwards a request message to the equipment of the host 140 identifying that a request has been made and identifying the requestor. In the illustrative example, a pop-up window or similar access-request display element 142 is presented on a display of the host's equipment 140. In some embodiments, the access-request display element includes identifying information relating to the request, such as the requestor's name or phrase entered by the guest using the permission request display element 134. Alternatively or in addition, the identifying information can include the MAC address 135 of the requesting guest mobile phone 102. This allows the host to associate the permission request with the guest and/or the guest's mobile phone 102.

The access-request display element 142 can include a user entry element 143 to accept an acceptance, denial and/or modification from the host. In the illustrative example, the host is presented with a simple yes or no selection in association with the grant access request. The host can make the appropriate selection which can be forwarded to the IMS 118. The IMS 118, in turn, authorizes, denies and/or modifies authorization based on the host's selection. For example, if the host approves the request, the system 100 can register that in the host's profile 136 in either the white or gray list (if restrictions apply) and sends WPS request to the guest's mobile phone 102, granting access to the visiting Wi-Fi network 104.

By way of example, access can be granted with restrictions, e.g., association of the guest with a gray list of the host's profile 136. Restrictions can include, without limitation, a time duration threshold, a data transfer threshold, a permitted and/or restricted times of day, site restrictions, content type restrictions, e.g., restricting access to streaming video, content restrictions, e.g., restricting access to mature or content that might otherwise be inappropriate to some users, identification of blocked sites, and the like.

In some embodiments, the restrictions can be predetermined, e.g., being identified in association with a gray list within the host's profile 136. Accordingly, association of a particular requestor or guest with the gray list applies the predetermined restrictions. It is conceivable that the host can establish multiple gray lists, e.g., a child user list, an adult user list, an employee list, a visitor list, a family member list, and so forth. In some embodiments, the access-request display element 142 presented to the user can identify the one or more gray lists, e.g., allowing the host to make an appropriate selection at the time that access is granted. Alternatively or in addition, the access-request display element 142 can include features that allow the host to identify or otherwise modify restriction features at the time that access is being granted. Such features can include a listing of available gray lists, a listing of restrictions associated with existing gray lists, a listing of possible restrictions, e.g., that can be selected and/or de-selected to create or otherwise modify a gray list and so on.

Figure 2:
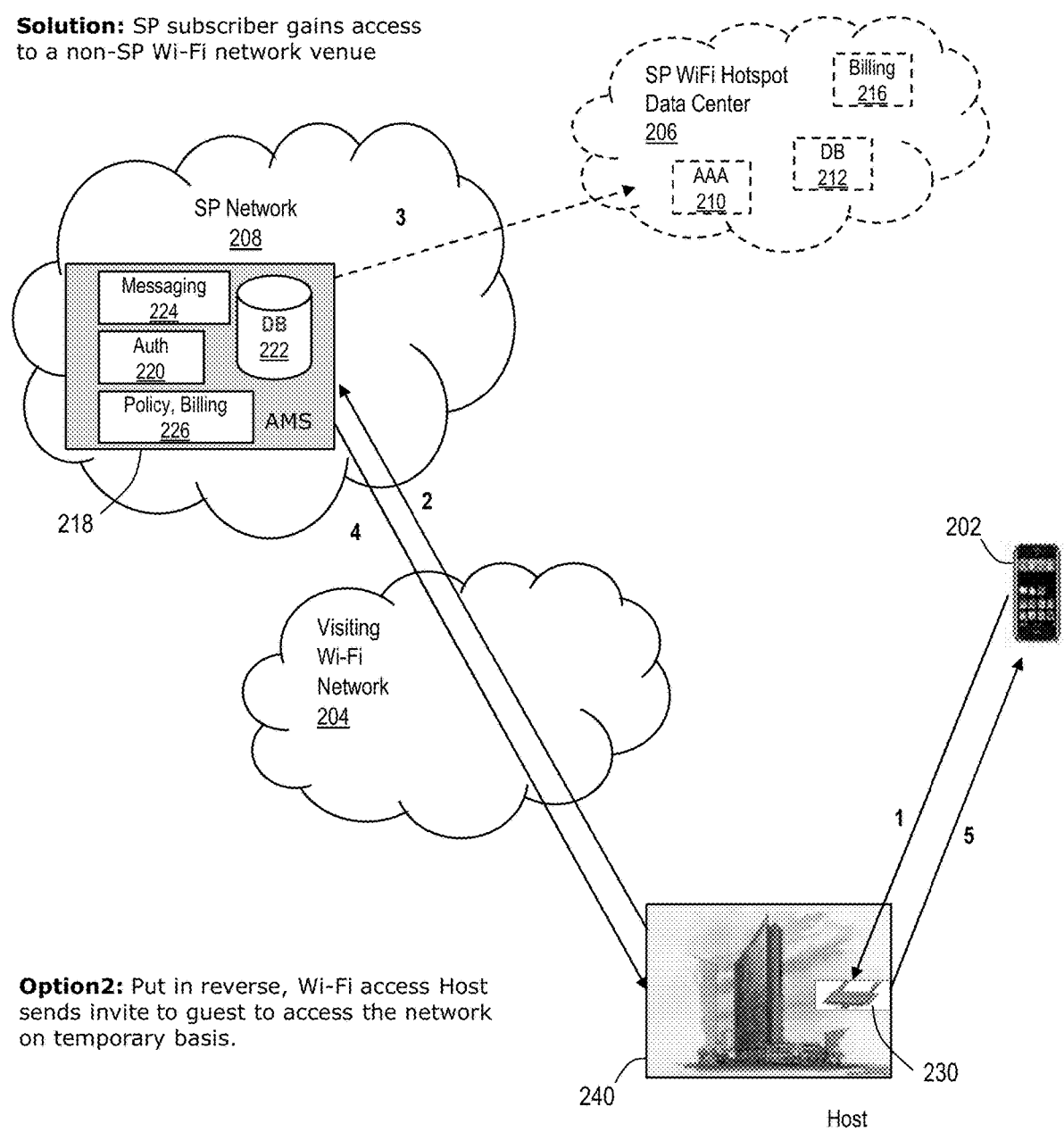
FIG. 2 depicts an illustrative embodiment of another architecture that allows a wireless access network to authenticate mobile communication devices.

FIG. 2 depicts an illustrative embodiment of another architecture 200 that allows a wireless access network to authenticate mobile communication devices. In case of a public venue, such as a business, e.g., a hotel, restaurant, or retail outlet, a school, a library, a museum, a public transportation system, and the like, a system can be preconfigured with a policy in place for whom the W-Fi network is accessible so the manual approval would not necessarily be required. In the example system, the host 240 offers a visiting Wi-Fi network 204 to its guests. A guest's mobile device 202 discovers the visiting Wi-Fi SSID as disclosed above. In response to selection of the SSID from the mobile device 202, a WAP 230 of the visiting Wi-Fi network 204 forwards an access request to an access management system 218. The WAP 230 may present an access-request display element 132 is presented on a display of the mobile phone 102 (FIG. 1). The guest may enter information and/or request permission as set forth above. Alternatively or in addition, the WAP 130 can obtain information automatically, such as the MAC address of the guest's mobile device 202, a location of the mobile device, an equipment type, and so on.

The access management system 218 can access a host's profile, e.g., stored within a profile database 222. An authorization module 220 of the access management system 218 can determine whether the guest and/or the guest's mobile device 202 is authorized based on the host's profile. As disclosed in reference to FIG. 1, the host's profile can identify authorized users, e.g., white list users, restricted users, e.g., gray list users, and/or black list users, e.g., prohibited users.

In some embodiments, a guest can register with the host and/or directly with a service provider. The registration can obtain information related to an identity of the guest, an identity and/or type of the guest's mobile device or any combination thereof. For example, a guest may pre-register one or more devices in association with planned travel to a hotel or business. For example, the pre-registration can be accomplished by the guest by way of a web site or portal that obtains identifying information of the guest, e.g., a name and/or rewards program ID, and/or information of the guest device, such as the device type, brand, model, MAC address and/or SIM card information. Such pre-registrations can be associated with a date and/or time or with a range of dates and/or times. In response to the pre-registration, the host's profile can be updated to include the pre-registered guest and/or guest device.

When dates and/or times apply, rules can be imposed, e.g., by the authentication module 220 and/or a policy module 226 to modify the host profile according to the dates and/or times. For example, authentication module 220 and/or a policy module 226 can record the dates and/or times and modify the host's profile to add and/or remove the gest and/or the guest device(s) from a white list and/or a gray list in association with the pre-registered dates and/or times.

In some embodiments, the authentication management system 218 is in communication with a data center hosting another service. In the illustrative example, the authentication management system 218 is in communication with a Wi-Fi hotspot data center 206. As illustrated, the Wi-Fi hotspot data center 206 can include one or more of an authentication, authorization and or accounting module 210, a storage module, e.g., database 212 and a billing module 216. Some service providers offer Wi-Fi hotspots based on a membership and/or subscription basis. It is understood that in at least some instances, a policy imposed within a host's visiting Wi-Fi network 204 can extent access to guests who have also subscribed to the Wi-Fi hotspot service. In this manner, the visiting Wi-Fi network 204 can be used to extend coverage of the Wi-Fi hotspot service provider.

It is understood that in any of the illustrative embodiments disclosed herein, a fee-sharing arrangement can be established. For example, by allowing the visiting Wi-Fi network 204 to serve as an extension of the Wi-Fi hotspot service, the host can be compensated by the Wi-Fi hotspot service provider, e.g., according to a cost or fee sharing arrangement. In this manner, the Wi-Fi hotspot service provider can extend coverage with little or no investment on infrastructure, while allowing hosts to derive revenue from existing visiting Wi-Fi networks 204. Without limitation, the fee sharing arrangements can be based on various scenarios, such as a standard fee without regard to a number of Wi-Fi hotspot subscribers and/or data units accessed by such subscribers. Alternatively or in addition, the host can be compensated based on a number of Wi-Fi hotspot subscribers that utilize the visiting Wi-Fi network 204 during any reporting period, a time duration associated with access granted to Wi-Fi hotspot subscribers during any reporting period, a volume of data and/or bandwidth used by such subscribers. Fee arrangements can be based on combinations of one or more of the foregoing, e.g., in association with times of day, days of week and so forth to allow for greater compensation during busy times/days, and the like.

Figure 3:
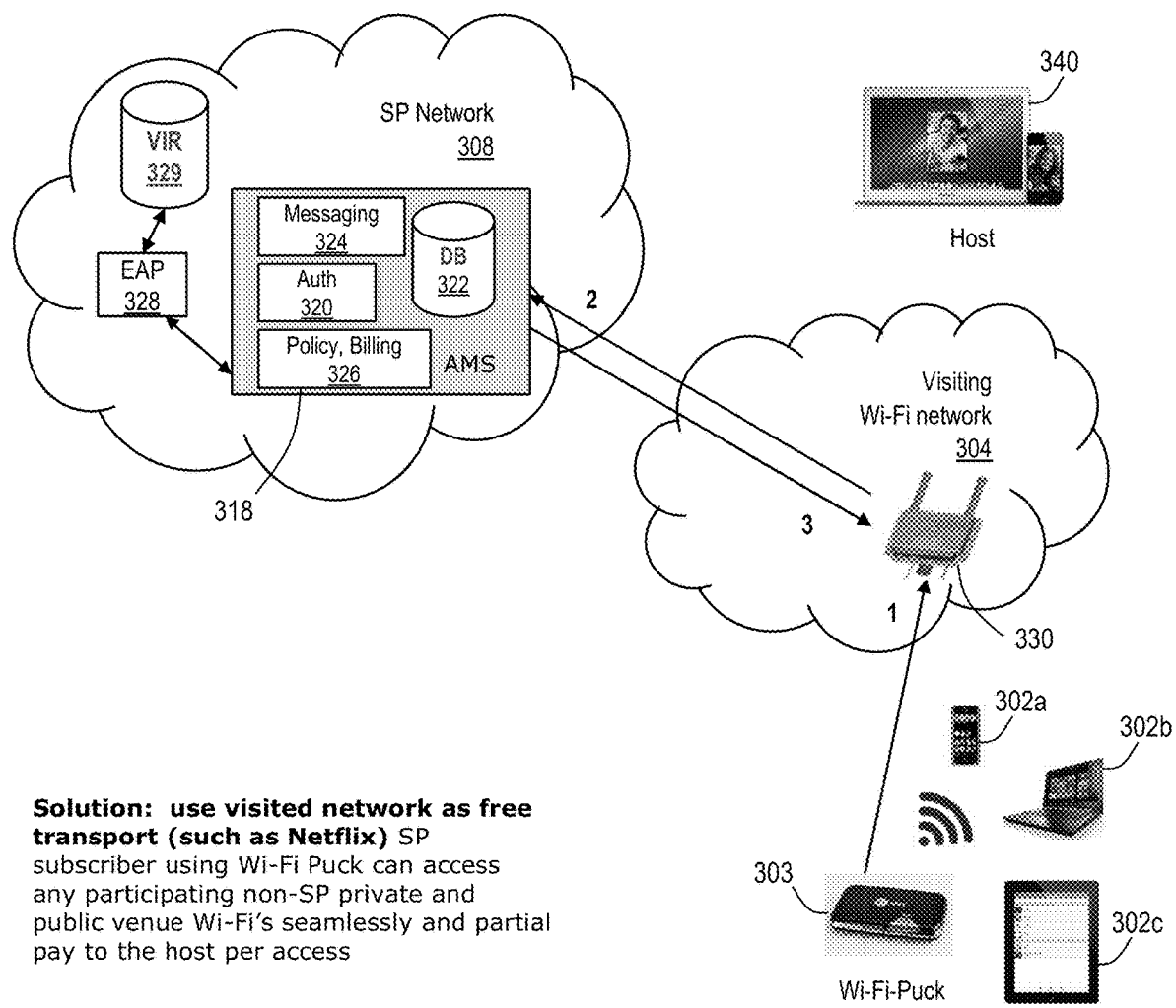
FIG. 3 depicts an illustrative embodiment of an architecture that facilitates wireless access to a subscribed wireless access service by way of another wireless access network.

FIG. 3 depicts an illustrative embodiment of an architecture 300 that facilitates wireless access to a subscribed network service by way of a visiting wireless access network. The system 300 includes a portable, wireless Wi-Fi hotspot, sometimes referred to as a Wi-Fi puck 303. In some embodiments, the portable Wi-Fi hotspot 303 selectively provides Wi-Fi access to one or more guest user devices, such as mobile phones 302a, laptop computers 302b, and PDAs or tablet devices 302c, generally 302. The portable W-Fi hotspot 303 is in wireless communication with a visiting W-Fi network 304, which is in communication with an access management system 318 of a service provider network 308.

The portable Wi-Fi hotspot 303 can coordinate access to the visiting Wi-Fi network 304 according to any of the authorization techniques disclosed herein. For example, a guest hotspot provider can locate an SSID of the visiting Wi-Fi network 304, select the SSID and access services if the WAP allows open access. To the extent open access is not available, the guest hotspot provider can enter a network key, if available to gain access, or initiate a request to a host. The request can take any of the forms disclosed herein, including entry of a guest hotspot provider name and/or phrase and/or providing identifying information of the portable wireless Wi-Fi hotspot 303, such as its MAC address.

Once again, the access management system can receive the request from a WAP 330 of the visiting Wi-Fi network 304, and process the request according to an authorization module 320. In at least some embodiments, the authorization module 320 accesses a host profile stored in a storage module 322. The host profile may obtain an association of the guest and/or the requesting portable, wireless Wi-Fi hotspot 303 with one or more lists, such as the white, black and gray lists disclosed hereinabove. To the extent that the guest device is associate on the list, a message can be generated by the messaging module 324 and returned to the portable, wireless Wi-Fi hotspot 303, via the WAP 330 of the visiting Wi-Fi network. Likewise, access can be authorized, prohibited, or restricted, as the case may be. In some embodiments, the authentication management system 318 is in further communication with an Extensible Authentication Protocol (EAP) module 328 and a Virtual Identity Repository (VIR) 329. The EAP 328 provides an authentication framework frequently used in wireless networks and/or point-to-point connections. Such network infrastructure supports various wireless exchange scenarios, including peer-to-peer.

Once the portable, wireless Wi-Fi hotspot has established access to the visiting Wi-Fi network 304, it can proceed to offer Wi-Fi access to other guest devices 302. In some embodiments, a first level of access authorization is provided for the portable, wireless Wi-Fi hotspot 303, and a second level of authorization is provided for other guest devices 302. For example, the other guest devices 302 can request access to a portable hotspot Wi-Fi network established by the portable, wireless Wi-Fi hotspot 303. The portable Wi-Fi hotspot 303 can adopt a role similar to the WAP 330 of the visiting Wi-Fi network 304, e.g., receiving a request from the other guest devices 302, and facilitating access based on the same access management system 318 and/or another access management system (not shown).

For example, a first access management system 318 can be provided by a first service provider associated with the visiting Wi-Fi network 304. Likewise, a second access management system can be provided by a second service provider, e.g., associated with the portable, wireless Wi-Fi hotspot 303. In this manner, access control can be controlled with a desired level of granularity and according to one or more different service providers. Once again, the policy and/or billing module 326 can apply one or more rules related to an accounting of access and/or usage. Such an accounting can be used in a fee-sharing arrangement, e.g., allowing for partial pay to the host per access. Once again, the host can include a host 340 of the visiting Wi-Fi network 304 and/or a host of the portable, wireless Wi-Fi hotspot 303.

The portable, wireless Wi-Fi hotspot 303 can be utilized in the visited Wi-Fi network 304 by taking advantage of a visited broadband network as a backhaul transport and adding Wi-Fi routing functionality to this equipment, without requiring any signaling and/or data exchange using a 3GPP mobile cellular network.

Such techniques allow for seamless access without a host needing to remember access keys and exchange any such keys with guests. Likewise, such flexible access to visiting Wi-Fi networks expands a service providers wireless coverage with subscriber provided Wi-Fi network resources. Such flexibility also supports a dynamic control of W-Fi usage of particular users, such as children, customers, patrons, and the like.

Figure 4:
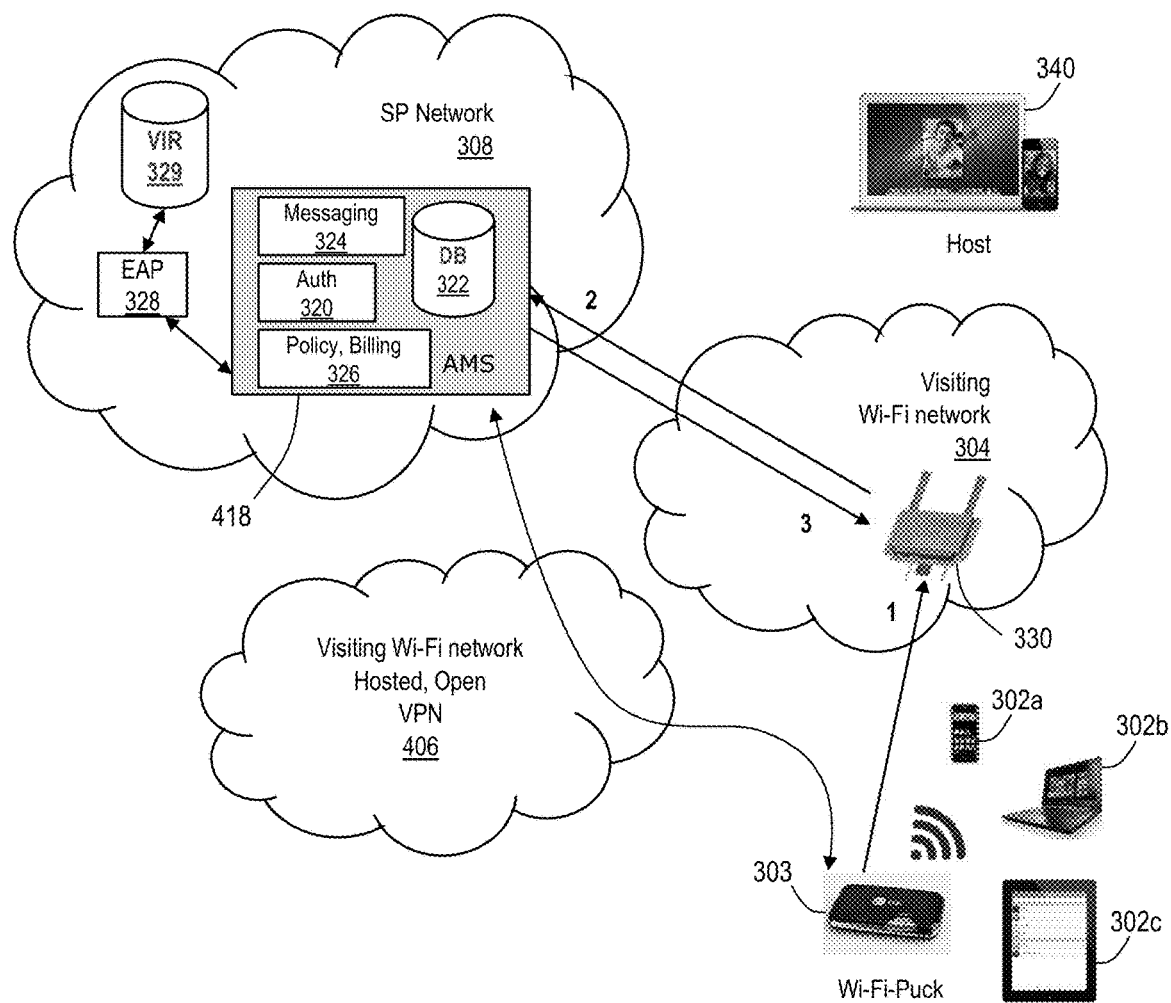
FIG. 4 depicts an illustrative embodiment of another architecture that facilitates wireless access to a subscribed wireless access service by way of another wireless access network.

FIG. 4 depicts an illustrative embodiment of another architecture 400 that facilitates wireless access to a subscribed wireless access service by way of another wireless access network. The illustrative example includes a second visiting Wi-Fi network 406 that is hosted as open and supports virtual private network (VPN) connections. Accordingly, it would be possible for a user-provided portable, wireless Wi-Fi hotspot 303 to provide wireless access to guest devices 302. Communications using the broadband and/or backhaul network segments can be implemented with a VPN having one end at the portable Wi-Fi hotspot 303 and another end at a distant network location, such as a service provider network 308. By implementing a VPN, security and/or privacy can be extended to network traffic, e.g., messages, and/or authorization control signaling to guard against exposure to a host of either the visiting Wi-Fi network 304 and/or the Visiting hosted open Wi-Fi network 406.

Figure 5:
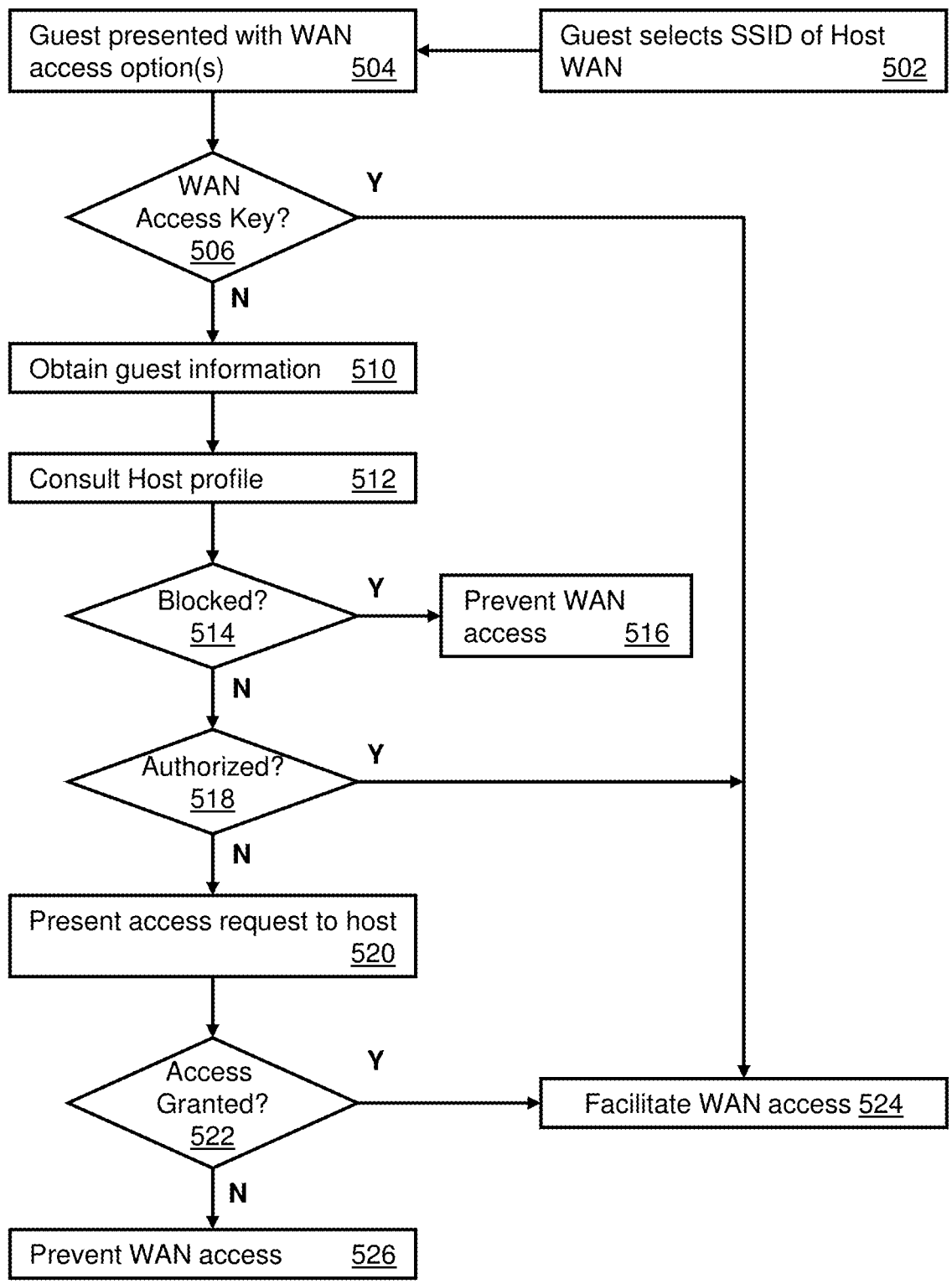
FIG. 5 depicts an illustrative embodiment of a process used in portions of the system described in FIGS. 1 and 2 to facilitate access to a wireless access network.

FIG. 5 depicts an illustrative embodiment of a process 500 used in portions of the system described in FIGS. 1 and 2 to facilitate access to a wireless access network. More particularly, an anonymous and/or open VPN can be established using the portable W-Fi hotspot. For example, an anonymous proxy can be established in a WiFi "puck," directing network traffic from a mobile device 502 to a carrier network 308 using a VPN. The puck 303 is situated between the mobile device 302 and a WiFi access point 330 using a visited WiFi network 304 as a transport, e.g., "free" transport or backhaul. Packets can be anonymous from deep packet inspection, allowing access to carrier services that might otherwise be blocked, e.g., by a host entity. This approach can include modified software and/or firmware in the puck 303 to add functionality, e.g., including Wi-Fi routing functions.

A guest within a range of a visiting Wi-Fi network is presented with WAN access option(s) at 504. This can include a list of available WANS according to their SSIDs. The guest can select the SSID of the host WAN at 502. In response to this selection the gest can be presented with a selectable option, such as an access-request display element 132 (FIG. 1). In some embodiments, the access-request display element includes a field to accept a WAN access key. To the extent that a proper WAN Access Key is entered and detected at 506, the guest is granted access to the visiting Wi-Fi network at 524.

In some embodiments, the access-request display element includes a field to accept or otherwise obtain guest information at 510. In response to receiving or otherwise detecting guest information entered at the access-request display element, a host profile is consulted at 512. In particular, the host profile is consulted to determine whether the guest as identified by one or more elements of guest information is identified within a list. As disclosed above, the lists can include a black list, a white list and in some instances, a gray list.

To the extent that the guest appears on a black list, access to the guest is blocked at 514, and the guest is prevented from accessing the WAN at 516. To the contrary, to the extent that the guest appears on a white list, access to the guest is authorized at 524, and the guest is allowed to access the WAN at 524. In some embodiments, the guest may be associated or otherwise appear in a gray list. In such instances, any WAN access authorized at 518 and provided at 524 is subject to any restrictions that may be associated with the guest and/or the gray list identifying the guest.

To the extent that the guest does not appear on any of the lists, an access request is generated, e.g., by a messaging unit 224 of the authorization management system 218 and presented to equipment of host at 520. Such presentations can be accomplished by one or more of an email, a short message service (SMS) message, a multimedia message service (MMS) message, a voice call, or a pop-up screen, e.g., according to a client application resident on the equipment of the host. The access request can identify one or more of the requesting guest, equipment of the requesting guest and a message generated by equipment of the guest.

The host can choose to grant access at 522. Such a grant can be accomplished by one or more of an email, a short message service (SMS) message, a multimedia message service (MMS) message, a voice call, or a selection of a selectable item appearing in a pop-up screen, e.g., according to a client application resident on the equipment of the host. To the extent access is granted, access of the guest equipment to the visiting Wi-Fi network is facilitated at 524. To the extent access is denied, access of the guest equipment to the visiting Wi-Fi network is prevented at 526.

Figure 6:
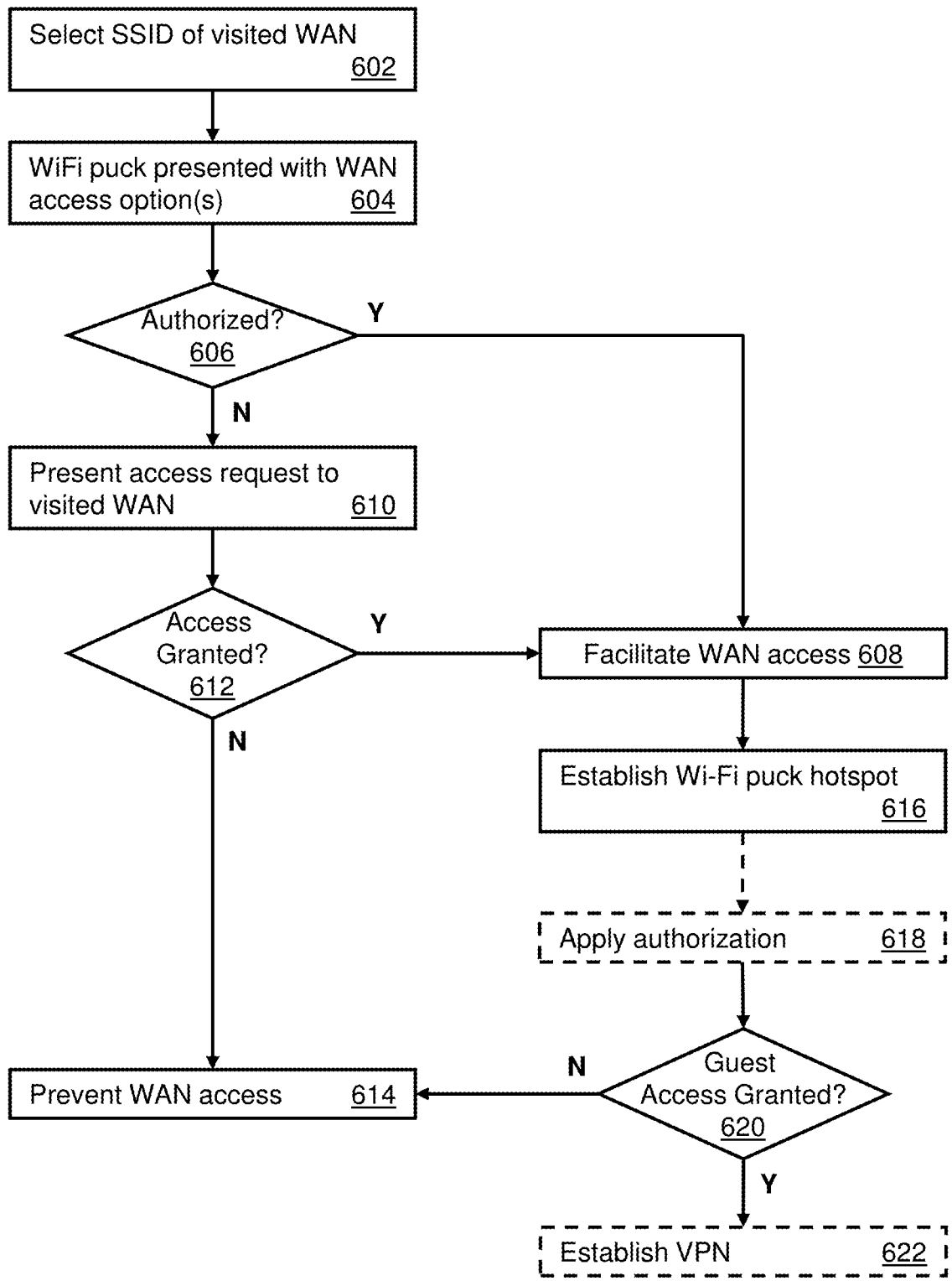
FIG. 6 depicts an illustrative embodiment of another process used in portions of the system described in FIGS. 3 and 4 to facilitate access to a wireless access network.

FIG. 6 depicts an illustrative embodiment of another process 600 used in portions of the system described in FIGS. 3 and 4 to facilitate establishment of a separate wireless hotspot based on access to a visited wireless access network. A Wi-Fi puck enters a visiting Wi-Fi network. An operator of the Wi-Fi puck detects an SSID of the visited Wi-Fi network, e.g., during a Wi-Fi configuration process. The operator can select the SSID of visited Wi-Fi network at 602. If the visited Wi-Fi network is configured as an open network, i.e., no password or network key, then the Wi-Fi puck simply establishes access to a WAP of the visited Wi-Fi network. To the extent that the visited W-Fi network is not open, the Wi-Fi puck presented with one or more visited Wi-Fi access option(s) at 604.

A determination is made at 606 whether the Wi-Fi puck is granted access or otherwise authorized to access the visited Wi-Fi network. This can be accomplished based on a predetermined association of the WiFi puck with a white or gray list of the host's profile. To the extent that access is granted, access to the visited Wi-Fi network is facilitated at 608.

If the Wi-Fi puck is not included in a predetermined authorized list, an access request can be generated and presented to equipment of a host of the visited Wi-Fi network at 610. To the extent that the host rejects the request, access of the Wi-Fi puck is denied or otherwise prevented at 614. To the extent that the host accepts the request associated with the Wi-Fi puck, access of the Wi-Fi puck to the visited Wi-Fi network is granted at 612, and access is facilitated at 608.

The Wi-Fi puck establishes a Wi-Fi hotspot, essentially, using the Wi-Fi puck as a WAP for the Wi-Fi hotspot at 616. The Wi-Fi hotspot and the visited Wi-Fi network can overlap to a greater or lesser extent. The networks can be operated on the same or different frequencies, and according to similar and/or different WAN protocols.

In some embodiments, the Wi-Fi puck applies an authorization process at 618. The process can be similar to one or more of the example authentication processes disclosed herein. A determination is made whether guest access to the Wi-Fi hotspot is granted to a guest device at 620. To the extent that guest access is not granted, access to the Wi-Fi hotspot is prevented at 614. To the extent that guest access is granted, the Wi-Fi puck can facilitate establishment of a virtual private network at 622. Such a VPN can protect message traffic between guest devices accessing the Wi-Fi hotspot and back-end network devices, such as broadband service provider, and/or digital service provider network data centers. Such VPNs can protect message traffic from exposure to deep packet inspection to provide a reliable and secure wireless solution despite potential vulnerability of the visited Wi-Fi network.

While for purposes of simplicity of explanation, the respective processes are shown and described as a series of blocks in FIGS. 5-6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
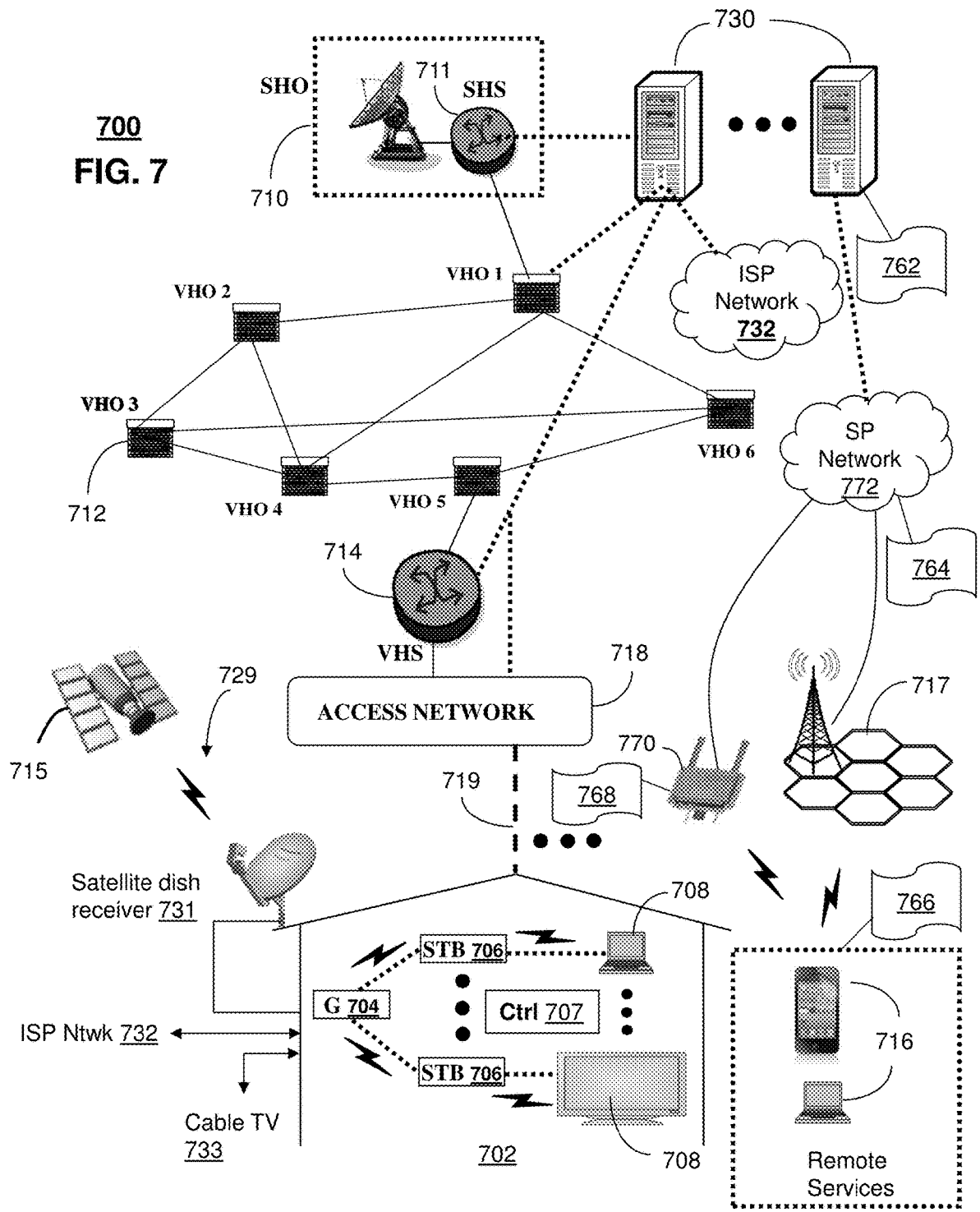
FIGS. 7-8 depict illustrative embodiments of communication systems that provide media services accessible by wireless access network architectures described in FIGS. 1-4.

FIG. 7 depicts an illustrative embodiment of a first communication system 700 for delivering media content. The communication system 700 can represent an Internet Protocol Television (IPTV) media system. The communication system 700 can be overlaid or operably coupled with the system 100, 200, 300, 400 of FIGS. 1, 2, 3 and/or 4 as another representative embodiment of communication system 700. For instance, one or more devices illustrated in the communication system 700 of FIG. 7, can detect a request for access to a wireless network via an access point. Responsive to a first determination that the identifier corresponds to an entry in the list, access is facilitated to the wireless network via the access point without the equipment of the requesting user providing credentials to the wireless network. The list includes a first set of entries corresponding to a first set of users having unrestricted access and a second set of entries corresponding to a second set of users having restricted access. Responsive to a second determination that the identifier does not correspond to any of the entries, a message is transmitted to equipment of the host regarding the request, and responsive to receiving approval, the list is updated to include the identifier.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

The communication system 700 can also provide for all or a portion of the computing devices 730 to function as an access management system (herein referred to as an AMS 730). The AMS 730 can use computing and communication technology to perform function 762, which can include among other things, the access management techniques described by one or more of the processes 500, 600 of FIGS. 5-6. For instance, function 762 of AMS 730 can be similar to the functions described for the AMS systems 118, 218, 318, 418 of FIGS. 1-4 in accordance with three or more of the processes 500, 600 of FIGS. 5-6. One or more of the wireless communication devices 716, a service provider network 772, and a WAP 768 can be provisioned with software functions 764, 766 and 768, respectively, to utilize the services of the AMS 730. For instance, functions 764, 766 and 768 of the wireless communication devices 716, the SP network 772, and the WAP 768 can be similar to the functions described for AMS systems 118, 218, 318, 418 of FIGS. 1-4 in accordance with three or more of the processes 500, 600 of FIGS. 5-6.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
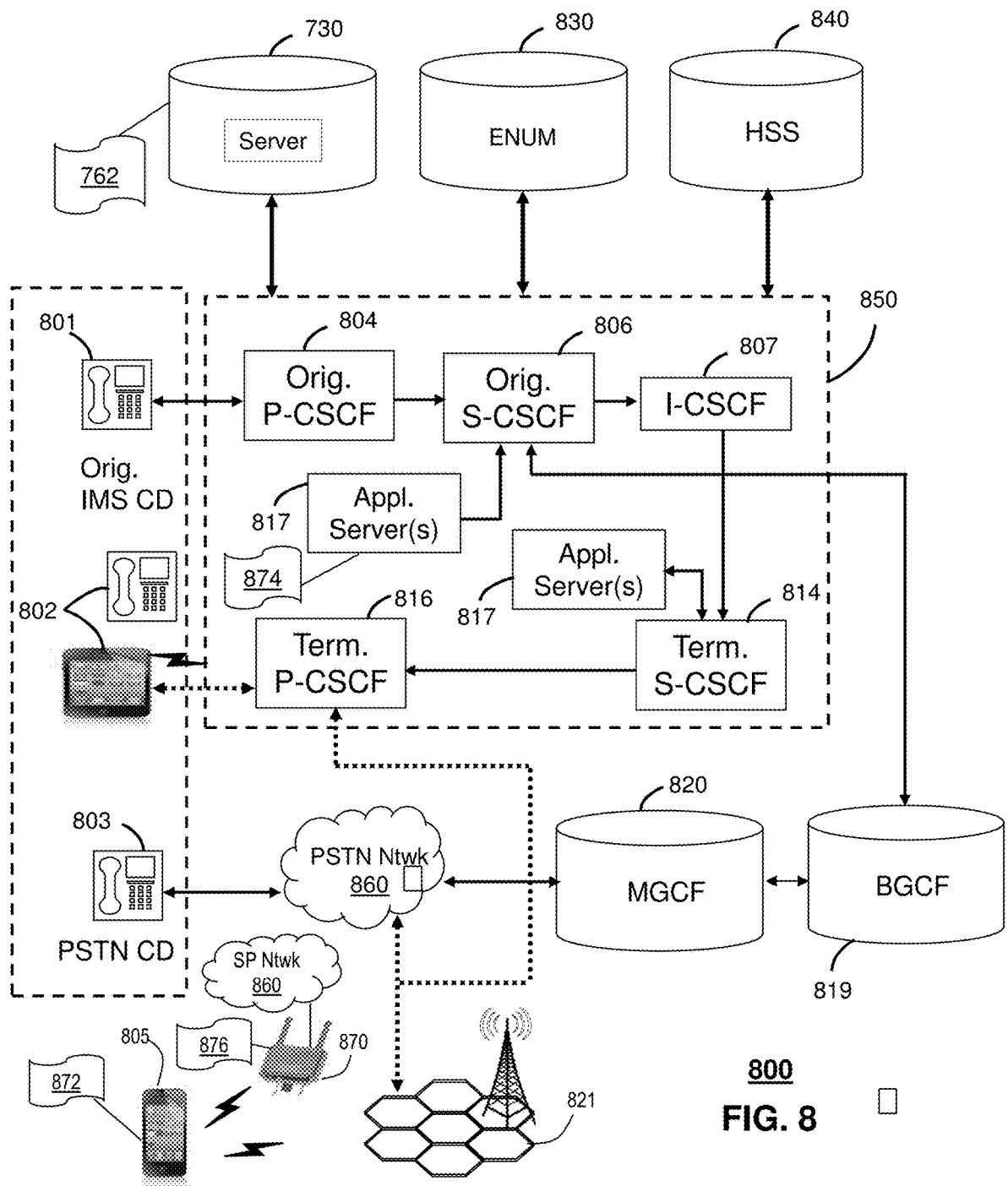

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100, 200, 300, 400 of FIGS. 1, 2, 3 and/or 4 and communication system 700 as another representative embodiment of communication system 700. A request is detected for access to a wireless network via an access point. Responsive to a first determination that the identifier corresponds to an entry in the list, access is facilitated to the wireless network via the access point without the equipment of the requesting user providing credentials to the wireless network. The list includes a first set of entries corresponding to a first set of users having unrestricted access and a second set of entries corresponding to a second set of users having restricted access. Responsive to a second determination that the identifier does not correspond to any of the entries, a message is transmitted to equipment of the host regarding the request, and responsive to receiving approval, the list is updated to include the identifier.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The AMS 730 of FIG. 7 can be operably coupled to communication system 800 for purposes similar to those described above. The AMS 730 can perform function 762 and thereby provide authentication services to the CDs 801, 802, 803 and 805 of FIG. 8, similar to the functions described for the AMS 118, 218, 318, 418 of FIGS. 1-4 in accordance with one or more of the processes 500, 600 of FIGS. 5-6. CDs 801, 802, 803 and 805, which can be adapted with software to perform function 872 to utilize the services of the AMS 730, similar to the functions described for c the AMS 118, 218, 318, 418 of FIGS. 1-4 in accordance with one or more of the processes 500, 600 of FIGS. 5-6. The AMS 730 can be an integral part of the application server(s) 817 performing one or more of function 874, 876, which can be substantially similar to function 762 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
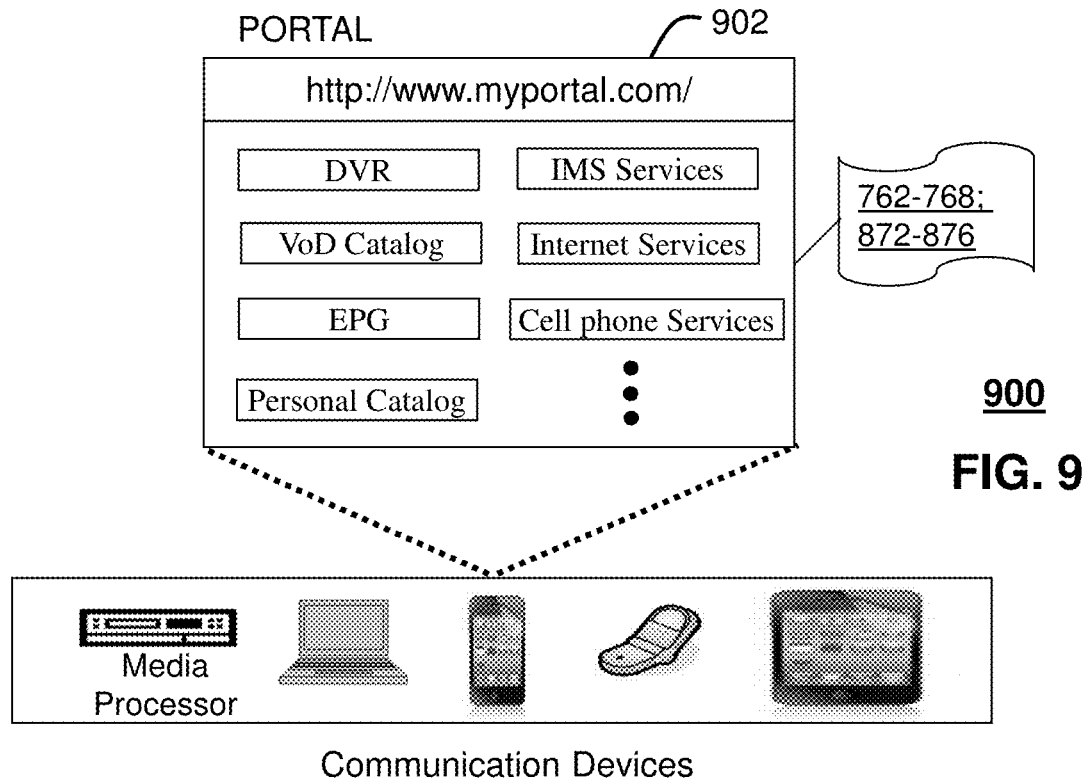
FIG. 9 depicts an illustrative embodiment of a web portal for interacting with communication systems that provide media services accessible by wireless access network architectures described in FIGS. 1-4.

FIG. 9 depicts an illustrative embodiment of a web portal 902 of a communication system 900. Communication system 900 can be overlaid or operably coupled with the systems 100, 200, 300, 400 of FIGS. 1, 2, 3 and/or 4, communication system 700, and/or communication system 800 as another representative embodiment of the systems 100, 200, 300, 400 of FIGS. 1, 2, 3 and/or 4, the communication system 700, and/or the communication system 800. The web portal 902 can be used for managing services of systems 100, 200, 300, 400 of FIGS. 1, 2, 3 and/or 4 and communication systems 700-800. A web page of the web portal 902 can be accessed by a Uniform Resource Locator (URL) with an Internet browser using an Internet-capable communication device such as those described in FIGS. 1, 2, 3 and/or 4 and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications 762-768, and 872-876 to adapt these applications as may be desired by subscribers and/or service providers of the systems 100, 200, 300, 400 of FIGS. 1, 2, 3 and/or 4, and communication systems 700-800. For instance, users of the services provided by the AMS 730 can log into their on-line accounts and provision the servers 110 or the AMS 730 with feature that a user may want to program such as user profiles, provide contact information to server to enable it to communication with devices described in FIGS. 1-4 and 7-8, and so on. Service providers can log onto an administrator account to provision, monitor and/or maintain one or more of the systems 100, 200, 300, 400 of FIGS. 1, 2, 3 and/or 4, or the AMS 730.

Figure 10:
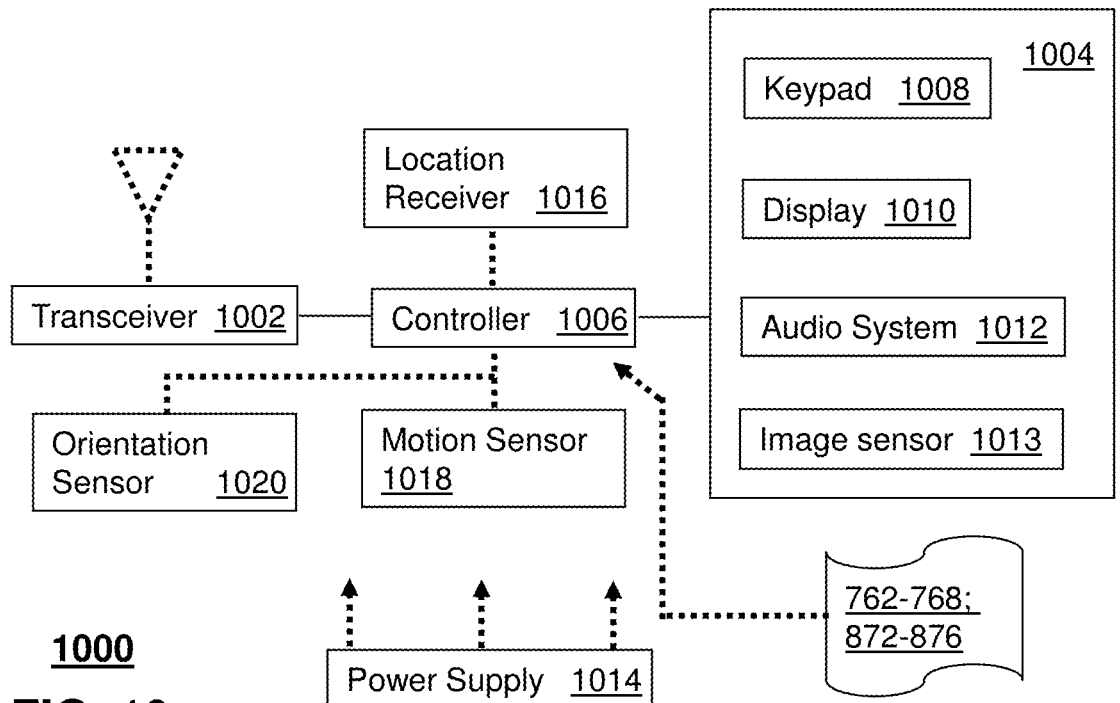
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1, 2, 3 and/or 4, and FIGS. 7-8 and can be configured to perform portions of one or more of the processes 500, 600 of FIG. 5, 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high-volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices of FIGS. 1, 2, 3 and/or 4, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in systems of FIGS. 1, 2, 3 and/or 4, communication systems 700-800 of FIGS. 7-8 such as a gaming console and a media player. In addition, the controller 1006 can be adapted in various embodiments to perform the functions 762-768 and 872-876, respectively.

Upon reviewing the aforementioned embodiments, it would be evident to an artisan with ordinary skill in the art that said embodiments can be modified, reduced, or enhanced without departing from the scope of the claims described below. For example, in some embodiments, a Wi-Fi access host sends an invitation to a guest to facilitate access to a visiting Wi-Fi network. The request can be initiated automatically, e.g., by the WAP, upon detecting a presence of a guest's mobile device. Alternatively or in addition, the request can be initiated manually, e.g., by the host. Such manual requests can be directed to a particular individual, e.g., a particular guest, or more generally to users according to a distribution list, a user location, and the like. The invitation to the guest can be accomplished according to one or more of an email, a text message, a voice call, and the like. In at least some embodiments, the guest invitation is generated in an access management system application client, e.g., resident on a host device, and or by way of a portal, or other web page. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
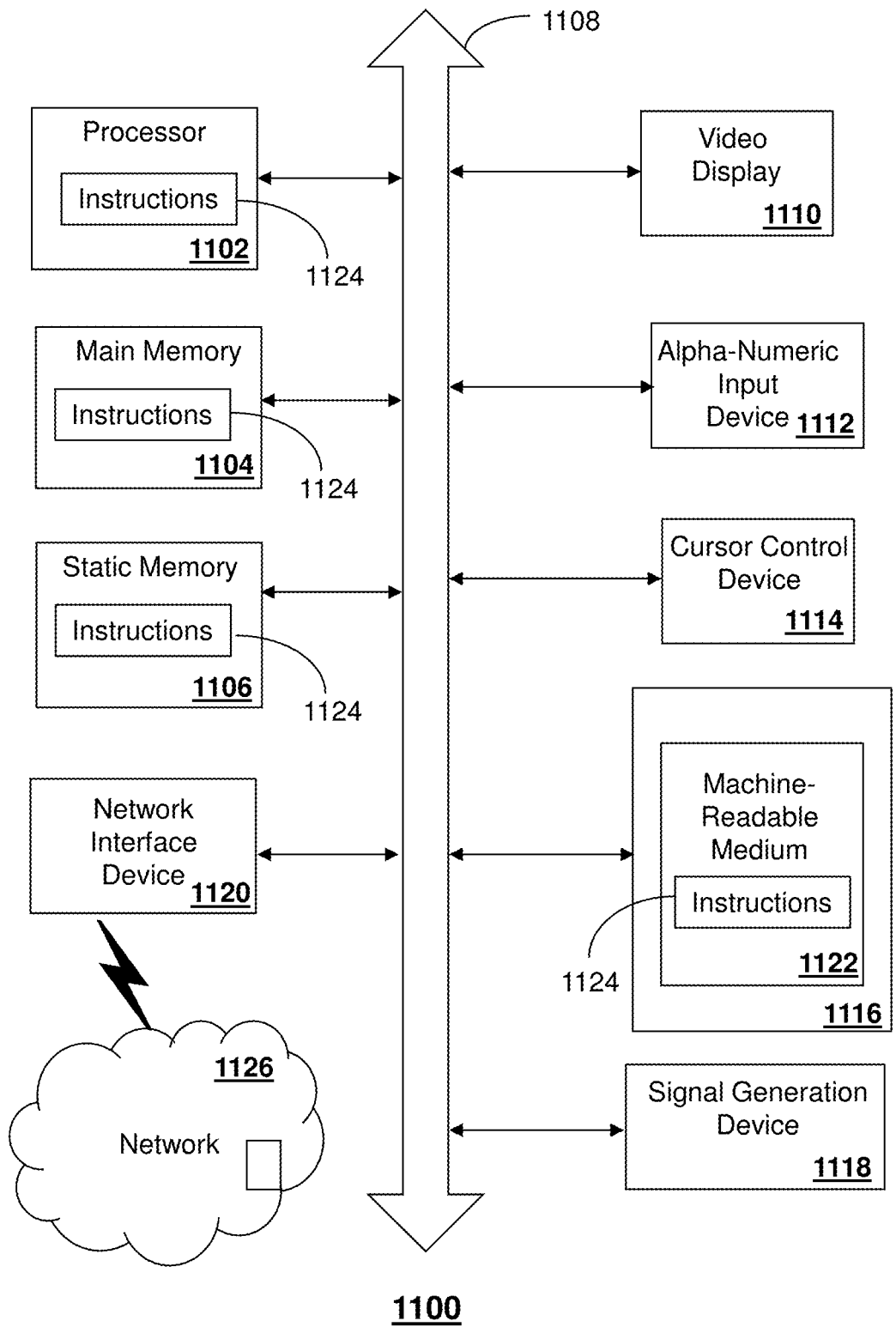
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the access management system 118, 218, 318, 418, 730, modules of the access management system, such as the authorization module 120, 220, 320, 420, the storage module 122, 222, 322, 422, the messaging module 124, 224, 324, 424, the policy and/or billing module 126, 226, 326, 426, and other devices of FIGS. 1-4 and 7-8. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to, solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, by a processing system including a processor, a request from equipment of a user for authentication to access a wireless network for initiating a communication session via an access point of the wireless network, wherein the request includes a user identifier for the user;

comparing, by the processing system, the user identifier with entries in a subscriber database of an Internet service provider (ISP), wherein the subscriber database is accessible through a network of the ISP;

responsive to a first determination that the user identifier corresponds to an entry in the subscriber database, based on the comparing:

facilitating, by the processing system, access to the wireless network via the access point by the equipment of the user, the equipment of the user thereby obtaining access to the wireless network for initiating the communication session based on the entry in the subscriber database; and responsive to a second determination that the user identifier does not correspond to any of the entries in the subscriber database, based on the comparing:

transmitting, by the processing system, a message to equipment of a host regarding the request, wherein the message requests access to the wireless network by the user; and responsive to receiving, by the processing system, approval of the request from the equipment of the host:

updating, by the processing system, a user profile of the host to include the user identifier as a user permitted access to the access point.

2. The method of claim 1, wherein the receiving a request from the equipment of the user comprises receiving, by the processing system, a Media Access Control (MAC) address of the equipment of the user and a user entry field including the user identifier for the user.

3. The method of claim 2, wherein the transmitting a message to equipment of a host regarding the request comprises transmitting, by the processing system, the MAC address of the equipment of the user and the user identifier for the user.

4. The method of claim 2, wherein the transmitting a message to equipment of a host regarding the request initiates presentation of an access request display element on a display of the equipment of the host, the access request display element including identifying information relating to the request.

5. The method of claim 1, wherein access to the wireless network is restricted in accordance with access criteria established by the host, wherein the access criteria include a type of equipment of the user, a duration of access, a time of day of access, a day of week of access, or a combination thereof.

6. The method of claim 5, wherein the access criteria include a requirement for approval from the equipment of a host prior to access by the equipment of the user.

7. The method of claim 1, wherein the request from the equipment of the user comprises a personal message, and wherein the transmitting of the message to the equipment of a host further comprises transmitting the personal message.

8. The method of claim 1, wherein a restriction of access to the wireless network is enforced in accordance with access criteria based on a time value.

9. The method of claim 1, further comprising: facilitating, by the processing system, access to the wireless network via the access point by the equipment of the user in response to the updating of the user profile to include the user identifier.

10. A system comprising:
a processing system including a processor; and
a memory that stores executable instructions that, when executed by the processing system, facilitate performance of operations, comprising:
identifying a request from equipment of a user for authentication to access a wireless network for initiating a communication session via an access point of the wireless network, wherein the request includes a user identifier for the user;
comparing the user identifier with entries in a subscriber database of a service provider, wherein the subscriber database is accessible through a network of the service provider;
responsive to a first determination that the user identifier corresponds to an entry in the subscriber database, based on the comparing:
facilitating access to the wireless network via the access point by the equipment of the user, the equipment of the user thereby obtaining access to the wireless network based on the entry in the subscriber database; and
responsive to a second determination that the user identifier does not correspond to any of the entries in the subscriber database, based on the comparing:
transmitting a message to equipment of a host regarding the request, wherein the message requests access to the wireless network by the user; and
responsive to receiving approval of the request from the equipment of the host, updating a user profile of the host to include the user identifier as a user permitted access to the access point.

11. The system of claim 10, wherein access to the wireless network is restricted in accordance with access criteria established by the host, wherein the access criteria include a type of equipment of the user, a duration of access, a time of day of access, a day of week of access, or a combination thereof.

12. The system of claim 11, wherein the access criteria include a requirement for approval from the equipment of the host prior to access by the equipment of the user.

13. The system of claim 10, wherein the identifying a request from equipment of the user comprises identifying network address information for the equipment of the user and a user entry field including the user identifier for the user.

14. The system of claim 13, wherein the transmitting a message to equipment of the host regarding the request comprises transmitting the network address information for the equipment of the user and the user identifier for the user.

15. The system of claim 13, wherein the transmitting a message to equipment of the host regarding the request causes presentation of an access request display element on a display of the equipment of the host, the access request display element including identifying information relating to the request.

16. The system of claim 10, wherein the request from the equipment of the user comprises a personal message, and wherein the transmitting of the message to the equipment of the host further comprises the personal message.

17. The system of claim 10, wherein the operations further comprise: searching online records of the host, a service provider of the user, records managed by a third party, or a combination thereof to locate the subscriber database.

18. A non-transitory, machine-readable storage medium comprising executable instructions that, when executed by a processing system including a processor, facilitate performance of operations, comprising:
detecting a request from equipment of a user for access to a wireless network for initiating a communication session via an access point of the wireless network, wherein the request includes a user identifier for the user;
comparing the user identifier with entries in a subscriber database of a service provider accessible through a network of the service provider;
responsive to a first determination that the user identifier corresponds to an entry in the subscriber database, based on the comparing:
facilitating access to the wireless network via the access point by the equipment of the user, the equipment of the user thereby obtaining access to the wireless network based on the entry in the subscriber database; and
responsive to a second determination that the user identifier does not correspond to any of the entries in the subscriber database, based on the comparing:
transmitting a message to equipment of a host for the wireless network regarding the request, wherein the message requests access to the wireless network by the user; and
responsive to receiving approval of the request from the equipment of the host, updating a user profile of the host to include the user identifier as a user permitted access to the access point.

19. The non-transitory, machine-readable storage medium of claim 18, wherein the operations further comprise: facilitating access to the wireless network via the access point by the equipment of the user in response to the updating of the subscriber database to include the user identifier.

20. The non-transitory, machine-readable storage medium of claim 18, wherein the detecting a request from equipment of a user for access to a wireless network comprises:
detecting, in the request, network address information for the equipment of the user and a user entry field including the user identifier for the user; and
transmitting the network address information for the equipment of the user and the user identifier for the user to the equipment of the host, the transmitting the network address information and the user identifier causing presentation of an access request display element on a display of the equipment of the host, the access request display element including the user identifier for the user.

* * * * *